Jan. 26, 1965 J. M. BOYER 3,167,769

RADIO FREQUENCY REFLECTOR

Filed Sept. 26, 1960 5 Sheets-Sheet 1

INVENTOR:
Joseph M. Boyer

By Willard M. Graham
Agent.

RADIO FREQUENCY REFLECTOR

Filed Sept. 26, 1960 5 Sheets-Sheet 2

INVENTOR:
Joseph M. Boyer
By Willard M. Graham
Agent.

INVENTOR.
Joseph M. Boyer
By Willard M. Graham
Agent.

Jan. 26, 1965 J. M. BOYER 3,167,769

RADIO FREQUENCY REFLECTOR

Filed Sept. 26, 1960 5 Sheets-Sheet 4

INVENTOR:
Joseph M. Boyer
By Willard M. Graham
Agent.

Jan. 26, 1965 J. M. BOYER 3,167,769

RADIO FREQUENCY REFLECTOR

Filed Sept. 26, 1960 5 Sheets-Sheet 5

INVENTOR:
Joseph M. Boyer

By Willard M. Graham
Agent.

United States Patent Office 3,167,769
Patented Jan. 26, 1965

3,167,769

RADIO FREQUENCY REFLECTOR

Joseph M. Boyer, Rolling Hills, Calif., assignor to Northrop Corporation, Beverly Hills, Calif., a corporation of California Filed Sept. 26, 1960, Ser. No. 58,422
14 Claims. (Cl. 343—18)

The present invention relates to passive reflectors of electromagnetic energy, and more particularly, to an electrically resonant radar reflector having monostatic and bistatic response characteristics.

Conventional reflectors are designed to operate over considerable portions of the electromagnetic spectrum and to be responsive to incident waves from one or two given directions only. However, in the radar target field, a wide-banded frequency reflector is not necessarily desirable. For example, it is often desired to precisely determine the flight path of an aircraft in a traffic pattern, or the trajectory of a missile during a firing test. In the latter cases, the operating frequency of the radar system is of course predetermined, and it may be a disadvantage to have the reflector responsive to other, different, frequencies.

It has long been a desire in the radio art to obtain a passive reflector capable of returning a strong consistent echo back in the direction of the questing radar apparatus no matter from what direction in three-dimensional space it is illuminated, in other words having truly isotropic response. In some cases, it may be desired to have monostatic response, i.e., return an echo only in the direction of the original source, and in other cases to have bistatic response or reflect strongly in more than one direction.

It is, therefore, an object of the present invention to provide a reflector of electromagnetic energy which gives maximum performance at a single radio frequency, or across a relatively narrow band of frequencies, and which is poorly reflective of questing radar beams at other frequencies.

It is another object of this invention to provide a reflector capable of returning a substantially constant high intensity echo in the incident direction, no matter from what relative three-dimensional direction it is illuminated.

In one particular embodiment, it is an object of the present invention to provide a resonant isotropic reflector having a substantially monostataic response, and in another particular embodiment to provide a similar reflector having both bistatic and monostatic response.

Other ancillary objects are to provide a reflector having a high ratio of radar cross sectional area to physical cross sectional area, and having a negligible weight in comparison to its size.

Further objects and features of advantage will be noted during the description of specific apparatus to follow.

Briefly, my invention comprises a large plurality of relatively small scattering obstacles sized and spaced according to a definite arrangement and forming an overall relatively large approximately spherical shape. It also encompasses a hemisphere and other overall shapes which are portions of a complete sphere. Each obstacle is basically of a size such that it is electrically resonant at the wavelength of the incident radiation to be reflected thereby, although I prefer to vary this to a certain extent for particular results to be described later herein. The resonant scattering obstacles are held in the overall spherical shape by a low density dielectric material having a dielectric constant very close to that of air. Further, the obstacles are preferably electrically conductive and comprised of a very thin hollow shell so as to incur a minimum of weight.

This invention will be more fully understood and appreciated by referring to the following detailed specification and to the accompanying drawings.

Figures 2, 3, 4, 4A:
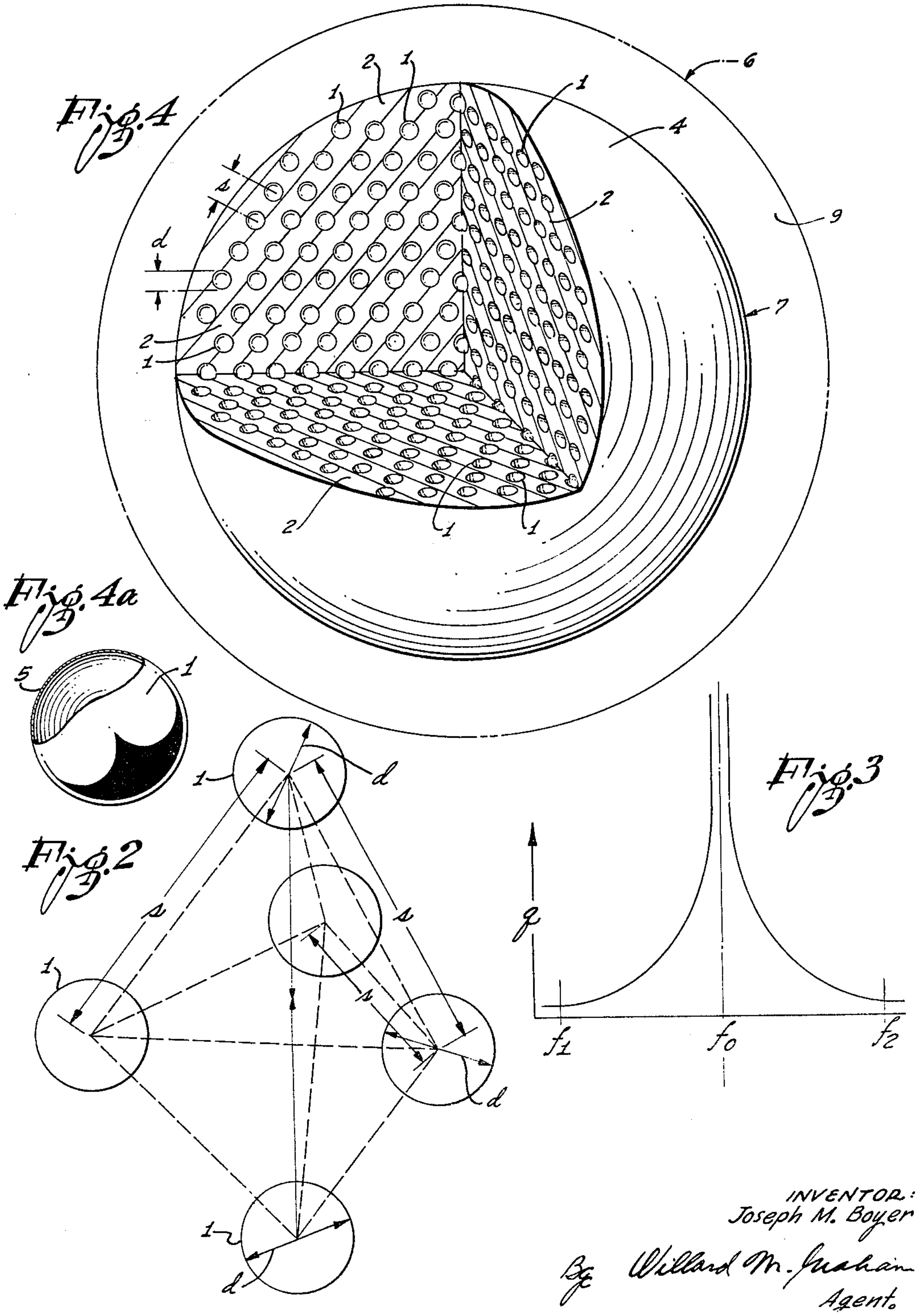
FIGURE 2 is a perspective diagram showing a typical arrangement of five scattering obstacles within a reflector of the present invention.
FIGURE 3 is a curve showing the effective dielectric constant of a conductive obstacle in the region of electrical resonance.
FIGURE 4 is a diagrammatic view of a reentrant lens reflector made according to the present invention and using spheres as the resonant scattering obstacles, one quadrant being cut away to show internal arrangement.

FIGURE 4*a* is an elevation view, partly in cross section, showing one of the resonant spheres of FIGURE 4 on an enlarged scale.

Figure 5:
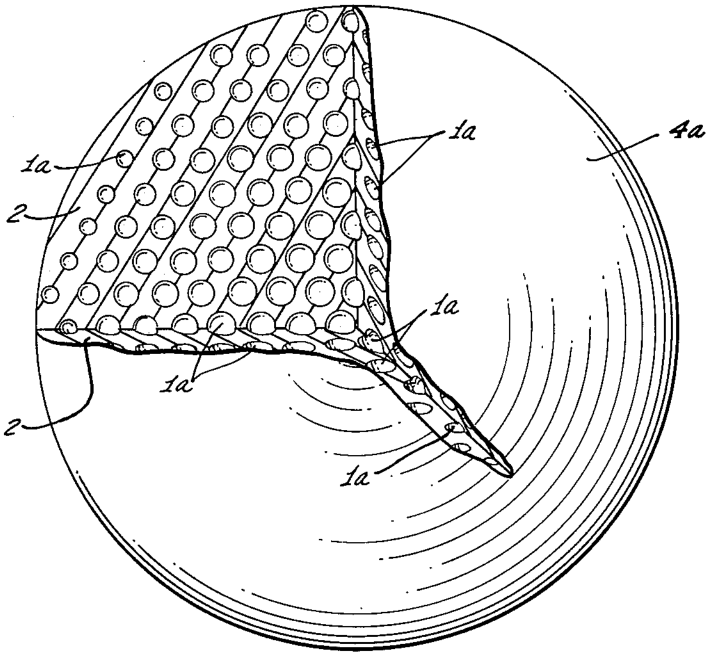

FIGURE 5 is a diagrammatic view of a reflector made of resonant spheres in accordance with a second embodiment of this invention.

Figure 6:
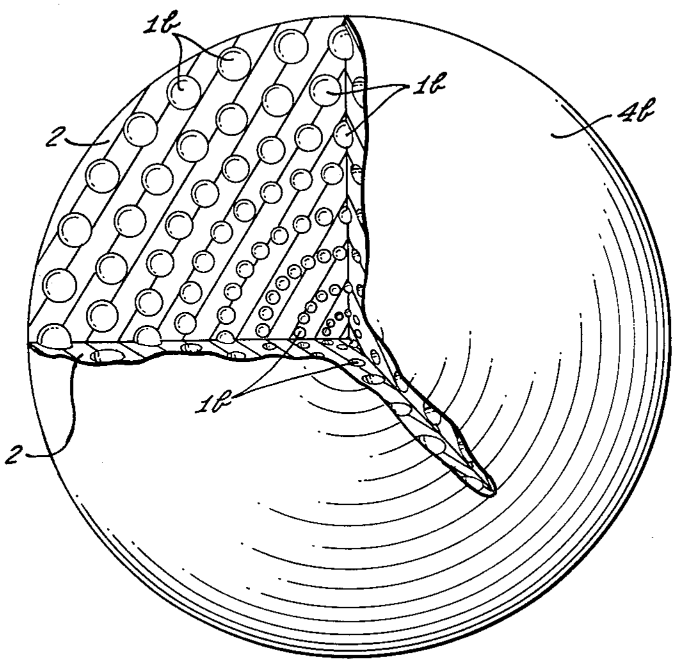

FIGURE 6 is a diagrammatic view of a reflector made of resonant spheres in accordance with a third embodiment of the invention.

Figures 7, 8:
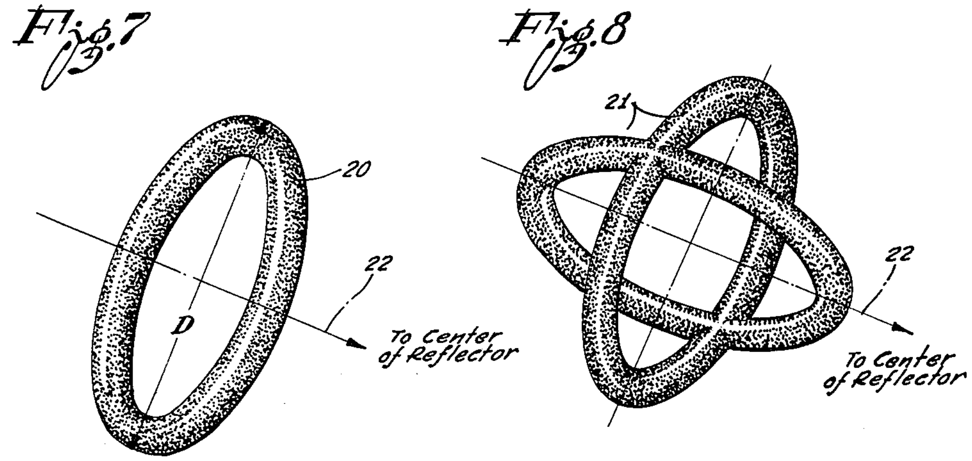

FIGURES 7 and 8 are perspective views of a ring and of crossed rings, respectively, which are used as resonant scattering obstacles in the present invention.

Figure 9:
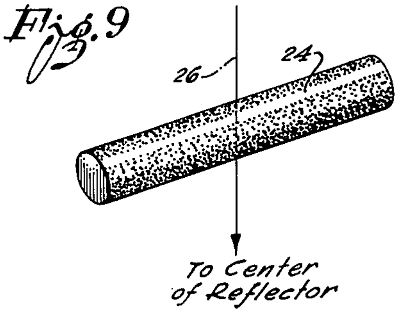
Figure 10:
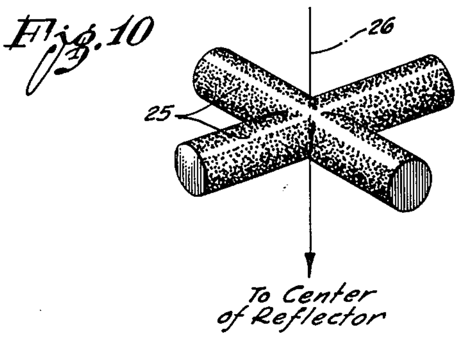

FIGURES 9 and 10 are perspective views of a cylindrical wire or rod and crossed cylinders, respectively, which are used as resonant scattering obstacles in the present invention.

Figure 11:
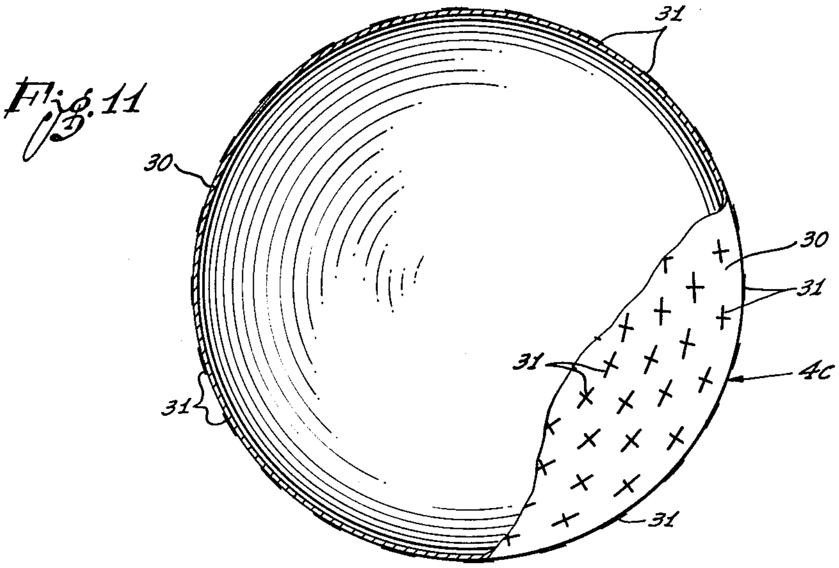

FIGURE 11 is a cut-away view, largely in cross section, of a reflector comprising a hollow spherical shell or membrane, showing the use and alignment of resonant crossed rod scattering obstacles on its surface only.

Figure 12:
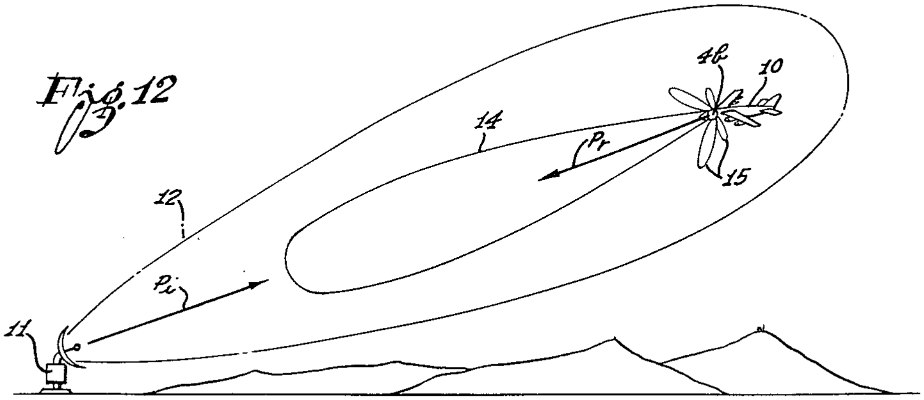

FIGURE 12 is a view showing a typical monostatic response pattern of a preferred embodiment of this invention when carried in an aircraft being interrogated by a ground-based radar set.

Figure 13:
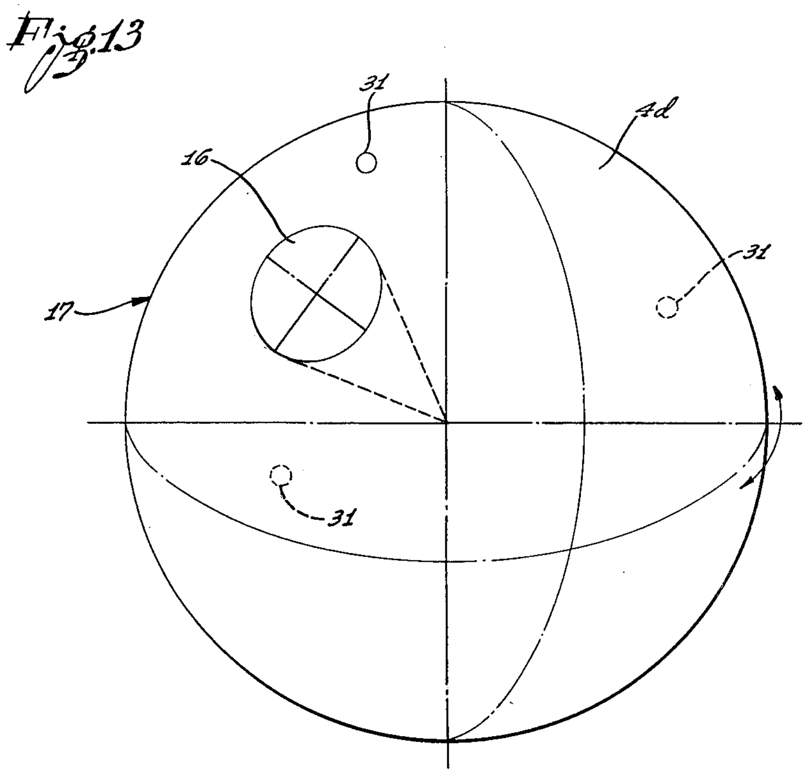

FIGURE 13 is a view of the present invention showing an identification means therein.

Figure 14:
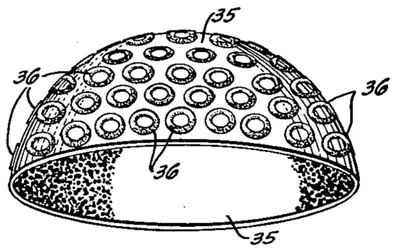

FIGURE 14 is an elevation view of a hemispherical surface reflector, showing rings as the resonant scattering obstacles.

Figure 1:
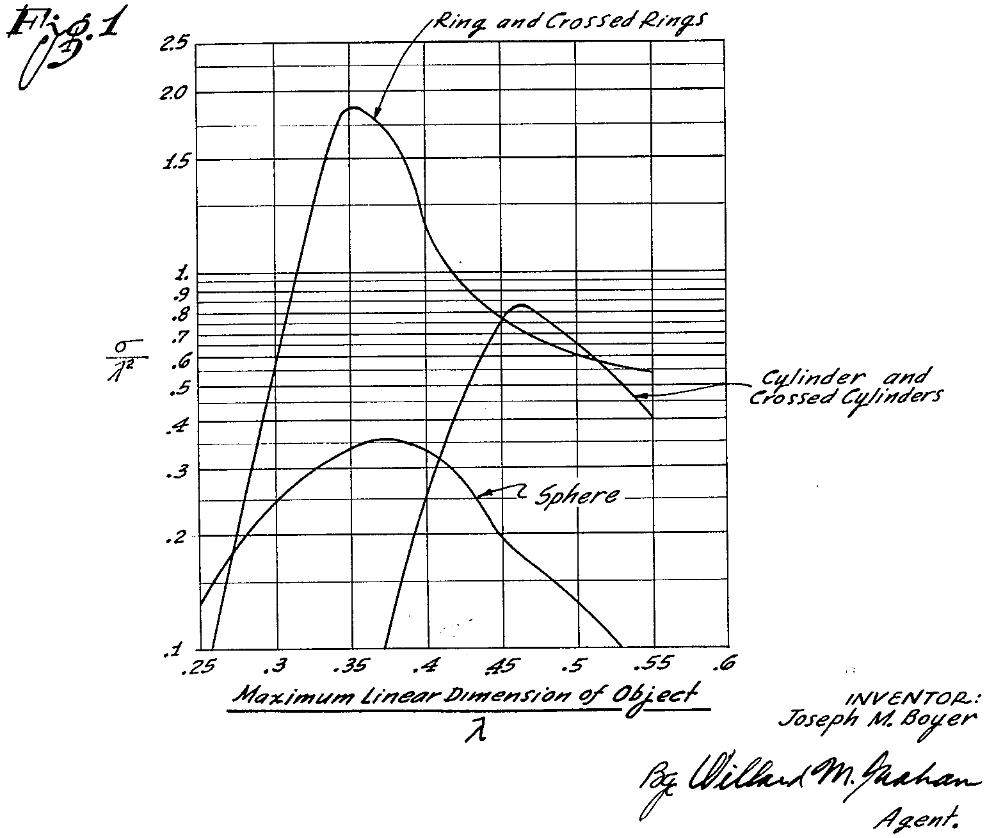
FIGURE 1 is a set of curves showing the normal reflection response of individual electrically conductive bodies of different shapes versus the ratio of body size to wavelength of incident radio energy.

Referring first to FIGURE 1 for a detailed description of my invention, it is seen that for three different shapes of individual objects, there are certain ratios of object size to wavelength $\lambda$ of an incident radio frequency wave, where a strong electrical resonance occurs. In this figure, maximum linear dimension (diameter in the case of a sphere) and $\lambda$ are in the same units of measure, and the reflected signal strength is proportional to the back scatter cross section area $$\frac{\sigma}{\lambda^2}$$

It is known that a resonant object behaves as an electric dipole, and thus forms a dipole with the poles aligned to match the incident field. However, this knowledge of the prior art, taken by itself, is not particularly useful, since in the wavelength bands used by radar, for example, a single object of from .3 to .5 wavelength diameter is much too small to act as a detectable target at any substantial distance. Also, the radiation pattern of a single resonant object is a torus shape like that of the conventional half-wave dipole, and its field strength gain in a direction back toward the transmitter is not significant for use in radar. Such resonant miniature dipoles are used in my invention, however.

FIGURE 2 shows an arrangement of spherical conductive bodies 1 which more strongly affects an electromagnetic wave passing through their regions than a single sphere. The spacing $s$ between the centers of all conductive spheres 1 is constant and chosen to be from .48 to 1.12 times the wavelength of the incident field. The diameter $d$ of each sphere 1 is constant at from .30 to .46 wavelength. If a volume is filled with such spheres, measurements disclose that a plane wave encountering this region acts as if it had encountered a flat conductive plate. In other words, it reflects. This is similar to the action of light entering a material of different index of refraction.

Analysis shows that the plane wave penetrates such a region of resonant scatterers where the dielectric constant of the region changes rapidly from that of free space. In order to explain what happens, reference is made to FIGURE 3 which shows the relation of dipole moment of each resonant obstacle itself, if it were perfectly conducting, as the frequency varies. In this figure, $$q=1+\frac{k}{f_0^2-f^2}$$

where $q$ is the electrical dipole moment, $k$ is a proportionality factor, $f_0$ is the resonant frequency of the obstacle in its first anomaly ($d$=.30 to .46 wavelength in the case of a sphere), and $f$ is the frequency of the incident wave. Theoretically, if $f=f_0$, $q$ may assume unlimited magnitudes. In practice, certain losses such as circulating currents on the surface of the obstacle will cause $q$ to have a very great, but not unlimited, value.

Now it will be seen by those skilled in the art that in a region filled with conductive obstacles, of fixed center-to-center spacing which approaches one wave-length, the effective dielectric constant $e$ will vary in accordance with the equation: $e=e_0+Nq$, where $e_0$ is the real dielectric constant of the medium filling the space between obstacles, N is the number of obstacles per unit volume, and $q$ is the electric dipole moment of each obstacle. The quantity $q$ may be thought of as representing the frequency-dependent dielectric constant.

The change in effective dielectric constant will be gradual and continuous rather than abrupt and discontinuous. Thus, the incident plane wave will penetrate to some distance into a volume of resonant conductive scatterers before it enters a region of such high wave impedance that it is almost totally reflected. A non-symmetrical artificial resonant dielectric reflector, as so far described, however, would not be optimum in shape or very useful for most applications. Its maximum response would be when illuminated at a normal or perpendicular direction of incidence, similar to a flat plate.

FIGURE 4 shows a general embodiment of my invention, where I have shaped such a region of conductive resonant scattering obstacles into an overall spherical configuration, or substantially so. Here, each obstacle is a conductive sphere 1 comprising a thin shell 5 of highly conductive metal, as shown in FIGURE 4*a*, and having a constant diameter $d$ chosen to be between .30 to .46 wavelength at the center frequency of the radio band with which the reflector is to be operated. Measurements show that utilization of higher order anomalies that exist in the resonance responses at higher values of $$\frac{d}{\lambda}$$

cause a decrease in the desired response effects due to changes in the resonant mode damping coefficient. The spheres 1 are rigidly spaced in relation to each other by mounting them in a low density, low dielectric-constant spacing material 2 such as polystyrene foam for example, and the center-to-center spacing $s$ of each sphere 1 from its nearest neighbors is fixed at a value preferably between .48 and 1.12 wavelength at the operating frequency band. The overall diameter for the resulting spherical reflector body 4 can be of any desired size.

Instead of being embedded in a plastic foam material 2 as described, it may be desired to eliminate even this low loss media and support the conductive spheres 1 or other resonant scatterers within extremely thin plastic films similar to bubble surfaces, using plastic resins for the formation of such thin films, resembling soap solutions.

Due to the construction of the reflector 4 shown in FIGURE 4, a plane incident electromagnetic wave encountering the region occupied thereby will follow Snell's law for curved regions, no matter from which direction in space the incident rays come. However, it is pointed out that the electromagnetic outer boundary 6 of the quasi-optical lens does not lie at the same radius as that of the physical circumference 7 of the body 4. Thus, a reflector built in accordance with the present teachings produces an electromagnetic shell or space zone 9 surrounding body 4 which substantially exceeds the physical size of the latter and which therefore gives the reflector an effective diameter much greater than its actual diameter. The closeness of boundary 6 to body 4 is not to be regarded as drawn to scale, since it is shown for illustrative purposes only.

It is believed that the extended effective zone 9 is explained or caused by the existence of standing waves through this zone and their interaction with the incident wave. The standing wave magnitude is maximum at the physical surface 7 of body 4 and decreases in inverse square law proportion at increased distances from body 4, to a radial distance where their effect is not noticed. At any rate, rays entering this space zone 9 between the outer boundary 6 and the body circumference 7 are gradually diffracted into the body 4 and do not suffer substantial loss by sharp interface discontinuity reflection as is the case with purely optical phenomena. An important result of this behavior is that no dielectric-constant matching layer is required, as is used for optical coatings.

Total reflection or refraction occurs in a region close to the core of body 4, with the reflected wave encountering a conjugate diffraction pattern on its return path and forming an essentially parallel wavefront at some distance from the spherical reflector. Such a parallel wavefront will be recognized as being necessary for the production of a strong, highly directional radiation beam, i.e., a high reflector gain. In addition to the directly reflected wave, however, other, bistatic response lobes will be present. This bistatic response is obviously useful when it is desired to have one or more separate receiving stations receive a reflected signal in addition to the station transmitting the original wave or signal.

Another embodiment of the present invention is shown in FIGURE 5. In this configuration, the center-to-center spacing between resonant scattering obstacles, such as conductive spheres 1*a*, remains constant between .48 and 1.12 times the wavelength at the desired operating frequency, but the diameter increases linearly from about .2 wavelength at the outermost layer to between .30 and .46 wavelength at the center of the spherical body 4*a*. In other words, the size of the spheres 1*a* is smaller at the outside of the body than those of the first embodiment in FIGURE 4 and approaches the same size as those of the first embodiment at the center. This graduation of size of the conductive spheres 1*a* is of course more costly, but it tends to better preserve and make more uniform the characteristics of a wide band radar pulse signal than the constant diameter embodiment. A bistatic wave response applies also to the construction of the second reflector embodiment of FIGURE 5.

A third embodiment is illustrated diagrammatically in FIGURE 6. Here, the spacing between centers of the resonant scattering obstacles, such as conductive spheres 1*b*, at the outermost limit of the spherical body 4*b* is fixed from about one-half to one wavelength, and their diameters are fixed at a value between .30 and .46 wavelength. The spacing and diameters of the spheres 1*b* then decrease toward the center of spherical body 4*b*, preferably according to the relation:

$$k=\frac{r'}{2-r'}$$

where $k$ is the multiplier to be applied to the values of conductive sphere diameter and spacing at the surface, for any distance $r'$ from the center of body 4*b*, and $r'$ equals one at the surface of body 4*b*. Thus for example, at internal points halfway from the center to the surface of the desired size of spherical body 4*b*, the diameter of each conductive sphere 1*b* and the spacing between spheres at that distance is one-third of its respective value in the outermost layer. Theoretical sphere diameter and spacing exactly at the center are zero. Again, the spheres 1*b* are illustrative only, other specified shapes of resonant obstacles following the same laws.

This construction produces a maximum monostatic, isotropic radar cross section, with a minimum of bistatic response, when used where the diameters of the conductive spheres 1*b* in the outermost layer of the body 4*b* are .30 to .46 wavelength as described. The large initial dielectric constant of the outer layer does not produce an undesirable effect, due to the electromagnetic space zone 9 (FIGURE 4) surrounding the body 4*b*, as is present in the previously described embodiments.

FIGURE 12 shows diagrammatically how this third embodiment operates in cooperation with an incident radar beam. An aircraft 10, for example, is provided with the reflector 4*b* inside the forward section thereof. A radar transmitter 11, located on the ground, is directing a transmitted beam $P_i$, having a directive pattern shape 12, toward the aircraft 10. A strong monostatic reflected beam $P_r$ having a directive pattern shape 14, is being returned directly toward the transmitter 11 from the reflector 4*b*. Bistatic reflected energy, shown as lobes 15 for illustration only, is insignificant for all practical purposes of detecting or tracking. The reflected beam 14 is of high intensity at divers directional angles throughout $4\pi$ steradians no matter what the position or alignment of the aircraft 10 relative to the transmitter 11.

The resonant scattering obstacles have been illustrated and described, so far, as spheres. The graph of FIGURE 1 also shows the useful back scattering cross section and resonant sizes of two other types of preferred scatterers. Instead of spheres, the reflectors 4, 4*a*, or 4*b* can utilize a plurality of single conductive rings 20 or perpendicularly crossed rings 21 as shown in FIGURES 7 and 8, respectively. The rings 20 preferably are circular but may have an eccentricity from one to two, and the resonant outside diameter along the major axis D is within the range of .26 to .75 times the wavelength at the operating band. The cross section thickness is preferably from .008 to .25 times this wavelength. The crossed rings 21 have the same dimensions, and the plane of one ring is at 90 degrees to the other. As shown in FIGURES 7 and 8, the rings, when assembled in the spherical reflector body 4, 4*a*, or 4*b*, are positioned so that the central axis 22 perpendicular to the plane of one of the rings coincides with a radial line of the reflector. Also, when crossed rings are used, the other or 90-degree rings must for best results be aligned substantially parallel to each adjacent one, as are the meridian planes of the earth.

FIGURES 9 and 10 represent a solid or tubular conductive cylindrical wire or rod 24 and a pair of crossed rods 25, respectively, either of which can form the resonant scattering obstacles of the reflector 4, 4*a*, or 4*b*. The rods 24 have a resonant length of from .4 to .65 times the wavelength at the operating band, and the diameter or thickness of the rods 24 is preferably from .008 to .010 times the wavelength. When single rods 24 are used, they are aligned in substantially parallel rows in the spherical reflector. The crossed rods 25 have the same dimensions, and are at 90 degrees to each other. As shown in FIGURES 9 and 10, the rods, when assembled in the spherical reflector body are positioned so that the perpendicular line 26 through a midpoint of each coincides with a radius of the reflector. Also, when crossed rods are used, each rod of the pair must for preferred results be aligned substantially parallel to its corresponding rod of the adjacent pair, as are the planes including the lines of latitude and longitude, respectively, of the earth. This is illustrated in FIGURE 11, to be described later.

The crossed rings 21 and crossed rods 25, can be electrically connected to the one they are crossed with, or can be electrically insulated therefrom.

Another embodiment of my invention is shown in FIGURE 11. Here, a reflector body 4*c* comprises a hollow, low dielectric-constant membrane or shell 30 having resonant crossed rods 31 as the scattering obstacles, attached to its surface only. The obstacles 31 may be any of the particular shaped resonant objects sized and spaced as defined hereinbefore, and including conductive foil or "printed circuit" type structure. This reflector 4*c* lends itself admirably to a flexible, inflatable balloon structure for deployment from a carrier vehicle, for example, anywhere desired, including in orbits or positions in space or atmospheres of planets and the like.

The term spherical, in this specification, when applied to the overall shape of the total reflector body, is intended and hereby defined to include hemispheres and other portions or sections of a complete sphere or of a spherical surface. A reflector of such a configuration is shown in FIGURE 14. The substantially hemispherical dielectric body 35 may be the canopy of a parachute, for example, upon the surface of which are provided rings 36 as the resonant scattering obstacles. Rings 36 are dimensioned, spaced, and relatively positioned as described hereinbefore. The body 35 is a thin, radio transparent material such as polystyrene or polyethylene plastic film, and the rings 36 are of a flexible material such as silver ink or aluminized decals, for example, so that the reflector parachute can be initially packed into the desired small size before its use in a subsequent deployed state.

A still further teaching of the present invention is that while the resonant scattering obstacles have been particularly defined as electrically conductive bodies, they are not necessarily so. Experiments and calculations show that they can be composed of non-conductive materials and give comparable results if they possess a dielectric constant as widely different from that of air as possible, and have a very low electrical loss, such as polytetrafluoroethylene, for example, the latter being known in the art as Teflon.

In certain applications of the present invention, where it is used as an orbiting satellite for example, it may be desired to provide a characteristic identification function, by means of which the rotational velocity of the reflector body may be determined. FIGURE 13 illustrates such a means, in the form of a conical shaped void 16 in the reflector body 4*d*, the apex of the cone being at the center of the spherical body, and with the cone preferably extending all the way to the surface 17. This void 16 may be completely free of material of any kind, or may be a conical region composed of the same dielectric material as the remainder of the reflector but free of resonant scattering obstacles 31. The size of such void 16 may be selected in accordance with the identification characteristic desired, and the shape could be other than a cone and still come within the present teaching. In the case of the cone, the reflection return will be constant except when the reflector body 4*d* passes the position where the axis of the void 16 coincides with or closely approaches the power flow axis of the incident energy, at which time a substantial variation in return signal will be observed. A plurality of voids 16 may be provided for special purposes.

It is thus seen that a reflector has been provided which fulfills the before-enumerated objects. It differs entirely from known artificial dielectric bodies in electrical function and mode, specifically its frequency selective resonance and close dipole coupling. The conductive spheres themselves have in actual practice comprised silver coated ping-pong balls, thus giving extremely light weight to the entire reflector. The overall shape at the outer surface of the reflector does not have to be an exact sphere, but it is substantially so. Theoretically, it is a relatively large number of relatively small plane surfaces having corners defined by the resonant scattering obstacles 1, 1*a*, 1*b*, 20, 21, 24, 25, 31, or 36. As stated, the space zone 9 surrounding this reflector effectively increases its active diameter by a large margin and makes it unnecessary to provide a matching layer between regions of widely different dielectric constant for efficiency.

It is to be especially noted that the overall size of the present invention is unlimited. One test article employed 189 silver coated ping-pong balls of 1½-inch diameter in a 26-inch diameter overall sphere. The resonant frequency at the first mode is 2,654 megacycles. However, such bodies with larger overall diameters will produce much greater than proportionate increases of reflector gain. A 10½-foot diameter reflector of the present invention will give performance substantially equal to that of a 100-foot diameter balloon with a continuous conductive surface, while a 17-foot reflector of the herein disclosed type will give four times the performance of such a 100-foot balloon. An embodiment of this invention used as an orbiting satellite in space can obviously be many times larger than any figures mentioned in this specification. Similarly, I do not desire to be limited to any minimum size of reflector diameter.

While in order to comply with the statute, the invention has been described in language more or less specific as to structural features, it is to be understood that the invention is not limited to the specific features shown but that the method and means herein disclosed comprise the preferred form of several modes of putting the invention into effect, and the invention is therefore claimed in any of its forms or modifications within the legitimate and valid scope of the appended claims.

I claim:

1. In a radar system, a transmitter capable of transmitting an electromagnetic wave of a specified wavelength to a body and of receiving a reflected wave therefrom, a reflector body comprising a multiplicity of scattering obstacles having electrically conductive surfaces, each said obstacle being resonant at the wavelength of said wave, said obstacles having a center-to-center spacing from .48 to 1.12 times said wavelength in a dielectric material filling the space between said obstacles, said body having an approximately spherical overall shape.

2. In a radar system wherein a radar transmitter transmits an electromagnetic wave to a body to receive a reflected wave therefrom, a reflector body comprising a multiplicity of electrically conductive scattering obstacles each being resonant at the wavelength of said wave, said obstacles having a center-to-center spacing from .48 to 1.12 times said wavelength, and a dielectric material filling the space between said obstacles, said body having a substantially spherical overall shape.

3. A reflector of electromagnetic energy comprising a plurality of scattering obstacles having an electrically conductive surface, said obstacles being spaced apart in a substantially spherical volume by a dielectric material, the ratio of the greatest linear dimension of said obstacles to the wavelength of the electromagnetic wave for which said reflector is designed being constant at a value where said obstacles operate in one of their resonant modes, the center-to-center spacing of said obstacles being between .48 and 1.12 times said wavelength.

4. A reflector of electromagnetic energy comprising a plurality of scattering obstacles, said obstacles being spaced apart in a substantially spherical volume by a dielectric material, means defining a region devoid of said obstacles, said region extending generally radially from a small size near the center of said reflector to a larger size at the surface thereof.

5. A reflector of electromagnetic energy comprising a plurality of scattering obstacles, said obstacles being spaced apart in a substantially spherical volume by a dielectric material of plastic foam completely filling the space between said obstacles.

6. A reflector of electromagnetic energy comprising a plurality of scattering obstacles, said obstacles being spaced apart in a substantially spherical volume by a low dielectric constant material, said obstacles being resonant at the wavelength of the electromagnetic wave for which said reflector is used, and the center-to-center spacing of said obstacles being from .48 to 1.12 times said wavelength.

7. A reflector of electromagnetic energy comprising a plurality of resonant scattering obstacles each having an electrically conductive surface, dielectric means supporting said obstacles in a substantially spherical overall body, the maximum linear dimension of each said obstacle in the outermost layer in said body being in the region of .2 times the wavelength of the electromagnetic wave for which said reflector is designed, said maximum dimension increasing in successive inward layers to a value of about .26 to .75 times said wavelength at the center of said body, the center-to-center spacing of said obstacles being from .48 to 1.12 times said wavelength.

8. A reflector of electromagnetic energy comprising a plurality of resonant scattering obstacles each having an electrically conductive surface, dielectric means supporting said obstacles in a substantially spherical overall body, the maximum linear dimension of each said obstacle in the outermost layer in said body being about .26 to .75 times the wavelength of the electromagnetic wave for which said reflector is designed, the center-to-center spacing of said obstacles in said outermost layer being from .48 to 1.12 times said wavelength, said maximum dimension and the center-to-center spacing of said obstacles decreasing in predetermined proportion in successively inward layers.

9. Apparatus in accordance with claim 8 wherein said maximum dimension and said spacing decrease in successively inward layers in approximate geometric proportion to a negligibly small value at the center of said body.

10. A reflector of electromagnetic energy comprising a plurality of electrically conductive scattering obstacles spaced apart in a substantially spherical shaped body by a dielectric material, said obstacles being dimensioned to be resonant at a particular wavelength of electromagnetic energy for which said reflector is designed, said obstacles being spheres having a diameter within the region of .30 to .46 times said wavelength.

11. A reflector of electromagnetic energy comprising a plurality of electrically conductive scattering obstacles spaced apart in a substantially spherical shaped body by a dielectric material, said obstacles being dimensioned to be resonant at a particular wavelength of electromagnetic energy for which said reflector is designed, said obstacles being rings having a diameter within the region of .26 to .75 times said wavelength, the center axis perpendicular to the plane of each said ring being on a radius of said spherical volume.

12. A reflector of electromagnetic energy comprising a plurality of electrically conductive scattering obstacles spaced apart in a substantially spherical shaped body by a dielectric material, said obstacles being dimensioned to be resonant at a particular wavelength of electromagnetic energy for which said reflector is designed, said obstacles being cylindrical rods having a length within the region of .40 to .65 times said wavelength, each said rod being perpendicular at its midpoint to a radius of said spherical volume, and said rods being aligned in substantially parallel rows.

13. A substantially spherical shaped reflector of electromagnetic energy comprising a plurality of electrically conductive scattering obstacles spaced apart on only the surface of said reflector by a dielectric material, said obstacles being dimensioned to be resonant at a particular wavelength of electromagnetic energy for which said reflector is designed, the center-to-center spacing of said obstacles being from .48 to 1.12 times said wavelength.

14. A reflector of electromagnetic energy comprising a plurality of scattering obstacles, said obstacles being spaced apart in a portion of a substantially spherical volume by a dielectric material, said obstacles being resonant at the wavelength of the electromagnetic wave for which said reflector is used.

References Cited in the file of this patent

UNITED STATES PATENTS 2,752,594 Link et al. -------------- June 26, 1956